(12) United States Patent
Guglielmone et al.

(10) Patent No.: US 8,725,388 B2
(45) Date of Patent: May 13, 2014

(54) METHOD FOR OPERATING AN INJECTION SYSTEM OF AN INTERNAL COMBUSTION ENGINE

(75) Inventors: Federico Luigi Guglielmone, Rivoli (IT); Giovanni Avolio, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 617 days.

(21) Appl. No.: 13/021,267

(22) Filed: Feb. 4, 2011

(65) Prior Publication Data
US 2011/0192372 A1 Aug. 11, 2011

(30) Foreign Application Priority Data
Feb. 5, 2010 (GB) .................................. 1001890.1

(51) Int. Cl.
*F02B 3/12* (2006.01)

(52) U.S. Cl.
USPC ............ 701/104; 123/299; 123/305; 123/435

(58) Field of Classification Search
USPC ........................... 123/299, 305, 435; 701/104
See application file for complete search history.

(56) References Cited

U.S. PATENT DOCUMENTS

| | | | |
|---|---|---|---|
| 4,265,200 A | 5/1981 | Wessel et al. | |
| 5,402,760 A | 4/1995 | Takeuchi et al. | |
| 6,401,703 B1 | 6/2002 | Mamiya et al. | |
| 6,425,367 B1 | 7/2002 | Hiraya et al. | |
| 6,994,077 B2 | 2/2006 | Kobayashi et al. | |
| 7,497,199 B2 | 3/2009 | Canale et al. | |
| 2004/0040541 A1 | 3/2004 | Goto et al. | |
| 2005/0145214 A1* | 7/2005 | Damitz et al. | 123/299 |
| 2005/0211219 A1* | 9/2005 | Strom et al. | 123/299 |
| 2006/0162689 A1 | 7/2006 | Winkelman et al. | |
| 2008/0201056 A1* | 8/2008 | Moriya | 701/103 |
| 2009/0055083 A1* | 2/2009 | Sasaki et al. | 701/104 |
| 2009/0151697 A1* | 6/2009 | Hatano et al. | 123/435 |

FOREIGN PATENT DOCUMENTS

| | | |
|---|---|---|
| EP | 0570986 A2 | 11/1993 |
| EP | 1085191 A2 | 3/2001 |
| EP | 1088978 A2 | 4/2001 |
| EP | 1538325 A1 | 6/2005 |
| EP | 1607609 A1 | 12/2005 |

OTHER PUBLICATIONS

British Search Report dated May 28, 2010, issued in Application No. 1001890..1.
Egnell, R., "A Simple Approach to Study the Relation Between Fuel Rate, Heat Release Rate and NOx-Formation in Diesel Engines," SAE Technical Paper 1999-01-3548, Oct. 1999, pp. 1-3.

* cited by examiner

*Primary Examiner* — Erick Solis
(74) *Attorney, Agent, or Firm* — Ingrassia Fisher & Lorenz, P.C.

(57) ABSTRACT

A method is provided for operating a direct injection system of an internal combustion engine of a motor vehicle. The at least one fuel injection parameter is adjusted by a closed loop control of the injected fuel quantity.

14 Claims, 3 Drawing Sheets

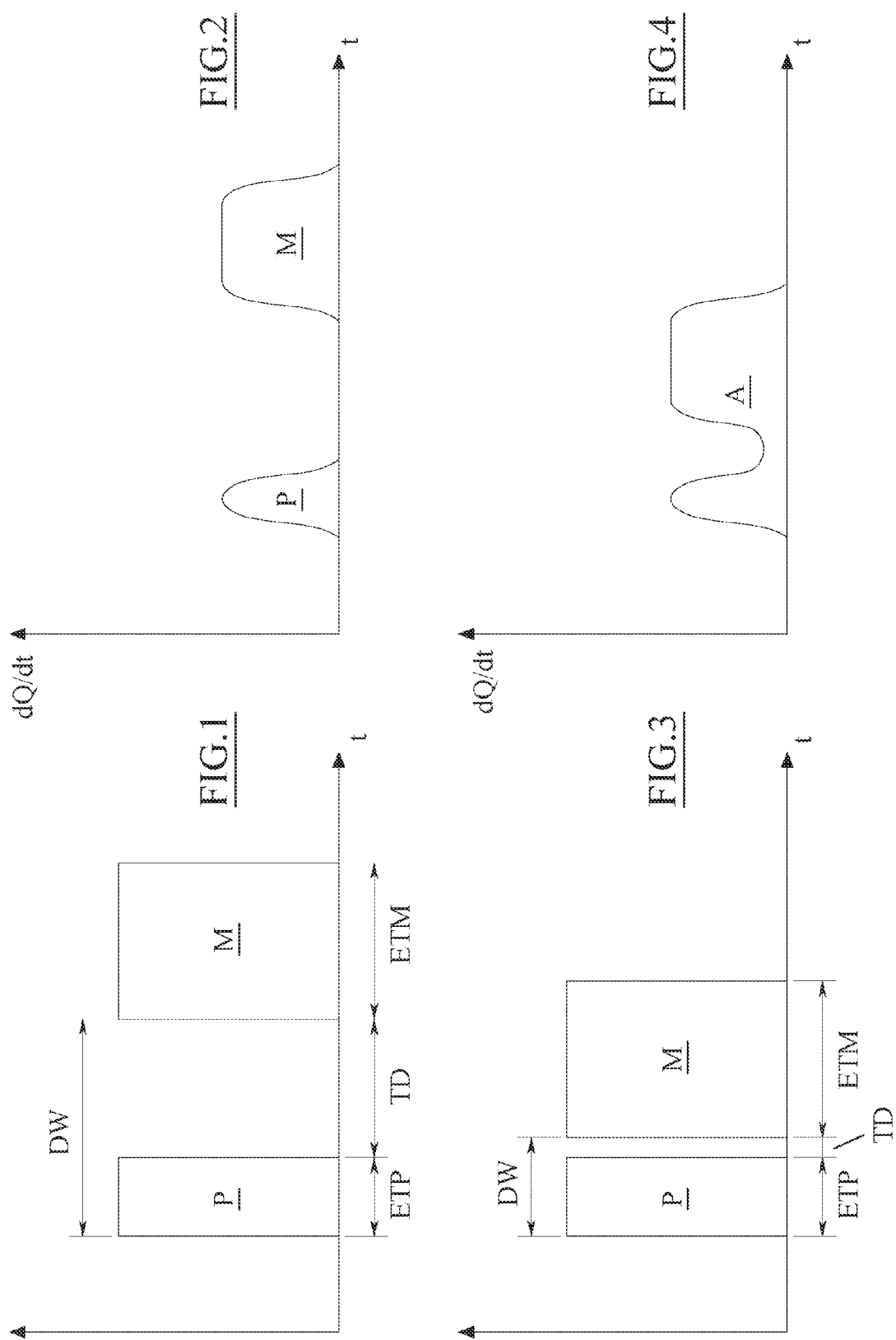

METHOD FOR OPERATING AN INJECTION SYSTEM OF AN INTERNAL COMBUSTION ENGINE

CROSS-REFERENCE TO RELATED APPLICATION

This application claims priority to British Patent Application No. 1001890.1, filed Feb. 5, 2010, which is incorporated herein by reference in its entirety.

TECHNICAL FIELD

The technical field relates to a method for operating a direct-injection system of an internal combustion engine of a motor vehicle, typically a Diesel engine, and generally directed towards direct injection systems comprising solenoid injectors.

BACKGROUND

It is known that a Diesel engine is generally equipped with a direct-injection system that comprises a plurality of electrically controlled fuel injectors, for injecting the fuel directly into the cylinders. The fuel injection in each cylinder is generally performed according to a multi-injection pattern, which comprises a plurality of injection events per engine cycle, including at least one pilot injection and one main injection.

Conventional fuel injection systems are designed for actuating each fuel injector as an on-off valve, so that the fuel injection rate during each injection event is substantially constant, and the fuel quantity injected per event depends principally on the opening period of the injector, usually referred as energizing time. In these systems, the injection strategy provides for controlling the combustion phase within each cylinder by properly adjusting the energizing time of each injection event and/or the dwell time between each couple of consecutive injection events of the same multi-injection pattern, whereby the dwell time is defined as the time period between the beginning of the electric signal responsible of the first injection event and the beginning of the electric signal responsible of the second injection event of the couple.

In order to comply with tighter emission regulations, most car makers are developing an injection strategy oriented towards the control of the combustion phase by replacing one or more injection events of the multi-injection pattern, typically the pilot and the main injections, with a single injection event, and by varying the fuel injection rate during the energizing time of said single injection event in a controlled manner. This strategy is generally referred as injection rate shaping, because the variation of the fuel injection rate causes a change in the shape of the fuel injection rate curve, whereby the fuel injection rate curve is defined as the curve resulting from plotting the fuel injection rate versus the energizing time.

This injection rate shaping achieves the benefit of reducing the combustion noise keeping the same level of polluting emissions and fuel consumption, or conversely of reducing the polluting emissions and fuel consumption keeping the same combustion noise. However, the injection rate shaping is currently applicable only to fuel injection systems equipped with Piezoelectric Direct Acting injectors.

A Piezoelectric Direct Acting injector is designed so that the injector needle is directly fixed to a piezoelectric actuator, which can effectively move the needle in a plurality of different positions, to thereby accurately adjusting the opening degree of the injector and then the fuel injection rate. On the contrary, conventional solenoid fuel injectors are actuated by an electro-mechanical device that can move the needle only in an open position or in a closed position, so that it is practically impossible to voluntarily regulate the opening degree of the injector for varying the fuel injection rate. Nevertheless, it has been found that a kind of fuel rate shaping can be realized also with a solenoid fuel injector, by means of the hydraulic combination or fusion of at least two consecutive injection events of the same multi-injection pattern, typically a pilot and a main injection.

The hydraulic fusion is achieved by reducing the time difference between the two injection events, whereby this time difference can be calculated as the difference between the dwell time separating the first and the second injection event and the energizing time of the first injection event. In greater detail, the hydraulic fusion is achieved by reducing said time difference to a value so small, typically less than approximately 100 μs, that the solenoid injector does not have enough time to completely close before it is commanded to open again. However, the positions assumed by the injector needle in this situation depend on so many factors, including all the mechanical forces acting on the needle itself, the manufacturing tolerances, as well as the fuel temperature, that it is practically impossible to precisely achieve a desired fuel injection rate. Moreover, it has been found that the sensitivity of the total fuel delivery to the timing distance between the two injection events is dramatically high, so that a little drift in injectors' mechanical and/or electric characteristics often results into a strong fuel delivery drift. As a consequence, the resulting injection rate shaping is generally not reliable.

In view of the foregoing, at least one object is to provide a strategy for operating the injection system of an internal combustion engine of a motor vehicle. At least another object is to provide a strategy capable of performing a kind of injection rate shaping, which is sufficiently reliable also in case of solenoid injectors. At least yet another object is to achieve the above mentioned goals with a simple, rational and rather inexpensive solution. In addition, other objects, desirable features and characteristics will become apparent from the subsequent detailed description, and the appended claims, taken in conjunction with the accompanying drawings and this background.

SUMMARY

A method is provided for operating a direct injection system of an internal combustion engine of a motor vehicle. The at least one fuel injection parameter is adjusted by a closed loop control of the injected fuel quantity. This solution allows controlling each injection event in a robust and stable manner. This solution can be applied both to injection system comprising piezoelectric direct acting injectors, and to injection system comprising solenoid injectors.

In the latter case, if two consecutive injection events of a multi-injection pattern are so close to result hydraulically fused together, this solution allows to compensate and to correct the potential injector drifts, thereby achieving a sufficiently reliable injection rate shaping. Accordingly, an embodiment provides for the method to perform a multi-injection pattern having at least two consecutive injection events that are separated by a time distance shorter than approximately 100 μs. This embodiment has the advantage of causing the hydraulic fusion of the two injection events.

According to another embodiment, the injected fuel quantity is estimated as a function of the in-cylinder pressure, namely the pressure within the cylinder. This embodiment has the advantage of being rather simple to be implemented, because the in-cylinder pressure is a parameter that is commonly determined also for other engine managing purposes and because reliable equations correlating the in-cylinder pressure and the injected fuel quantity are easily available in literature, by way of example from Rolf Egnell "A Simple Approach to Study the Relation Between Fuel Rate, Heat Release Rate and NOx-Formation in Diesel Engines", SAE Technical Paper 1999-01-3548, published on October 1999, pages 1-3.

According to an embodiment, the in-cylinder pressure is measured by means of an in-cylinder pressure sensor, which is a transducer located directly in the cylinder, for measuring the internal pressure. This embodiment has the advantage of providing a reliable in-cylinder pressure determination without increasing the cost of the modern Diesel engines, since the latter are generally already equipped with in-cylinder pressure sensors integrated in the glow plugs.

According to a further embodiment, the at least one fuel injection parameter is chosen from the energizing time of an injection event, for example the pilot injection energizing time or the main injection energizing time, and the dwell time between two consecutive injection events of a multi-injection pattern. This embodiment has the advantage of allowing a quick response of the closed loop control, since the injected fuel quantity is generally very sensitive to both the previously mentioned fuel injection parameters.

In greater detail, while the sensitivity of the injected fuel quantity to the energizing time is high substantially in all conditions and for each type of injectors, the sensitivity of the injected fuel quantity to the dwell time is particularly high for solenoid injectors, when the two consecutive injection events of the multi-injection pattern are sufficiently close to result hydraulically fused together.

According to an embodiment, each fuel injection parameter is adjusted by the steps of determining the difference between the injected fuel quantity and a target value associated to it, of determining a correction as a function of said difference, and of applying said correction to a reference value of the fuel injection parameter. This embodiment has the advantage of being rather simple and quick to be performed, so that it can be implemented by a microprocessor based apparatus, for example the ECU of the vehicle, without involving a great calculation effort.

According to another embodiment, the correction is determined by the steps of applying the difference between the injected fuel quantity and the target value to a controller, and of determining the correction as a function of the output of said controller. The use of a controller has the advantage of properly directing the correction that has to be applied to the reference value of the fuel injection parameter. According to an embodiment, the controller is a proportional-integral controller. The proportional-integral controller has the advantage of being rather simple to be calibrated and of eliminating the steady-state errors.

According to a further embodiment, the target value of the injected fuel quantity and the reference value of each fuel injection parameter are individually determined as a function of one or more engine operating parameters, such as for example engine speed and engine load. This embodiment has the advantage of considering the engine operating points, thereby achieving a reliable adjustment of the fuel injection parameter in most of driving conditions.

According to another embodiment, the target value of the injected fuel quantity and the reference value of each fuel injection parameter are individually determined from an empirically derived data set or map, which respectively correlates the target value of the injected fuel quantity and the reference value of a fuel injection parameter to one or more engine operating parameters, such as for example engine speed and engine load. This embodiment has the advantage that the data sets or maps can be determined with a calibration activity and then stored in a memory module of the ECU, to thereby allowing the latter to simply and quickly control the injection system during the real operation of the engine.

The method according to the embodiments can be carried out with the help of a computer program comprising a program-code for carrying out all the steps of the method described above, and in the form of a computer program product comprising the computer program. The computer program product can be embodied as a control apparatus for an internal combustion engine, comprising the ECU, a data carrier associated to the ECU, and the computer program stored in a data carrier, so that the control apparatus defines the invention in the same way as the method. In this case, when the control apparatus executes the computer program all the steps of the method described above are carried out. The method can be also embodied as an electromagnetic signal, said signal being modulated to carry a sequence of data bits which represent a computer program to carry out all steps of the method.

BRIEF DESCRIPTION OF THE DRAWINGS

The present invention will hereinafter be described in conjunction with the following drawing figures, wherein like numerals denote like elements, and FIG. 1 is a schematic representation of the electric signal commanding a multi-injection pattern;

FIG. 2 is a schematic representation of the fuel injection events corresponding to FIG. 1;

FIG. 3 is a schematic representation of the electric signal commanding another multi-injection pattern;

FIG. 4 is a schematic representation of the fuel injection events corresponding to FIG. 3;

DETAILED DESCRIPTION

Figure 5:
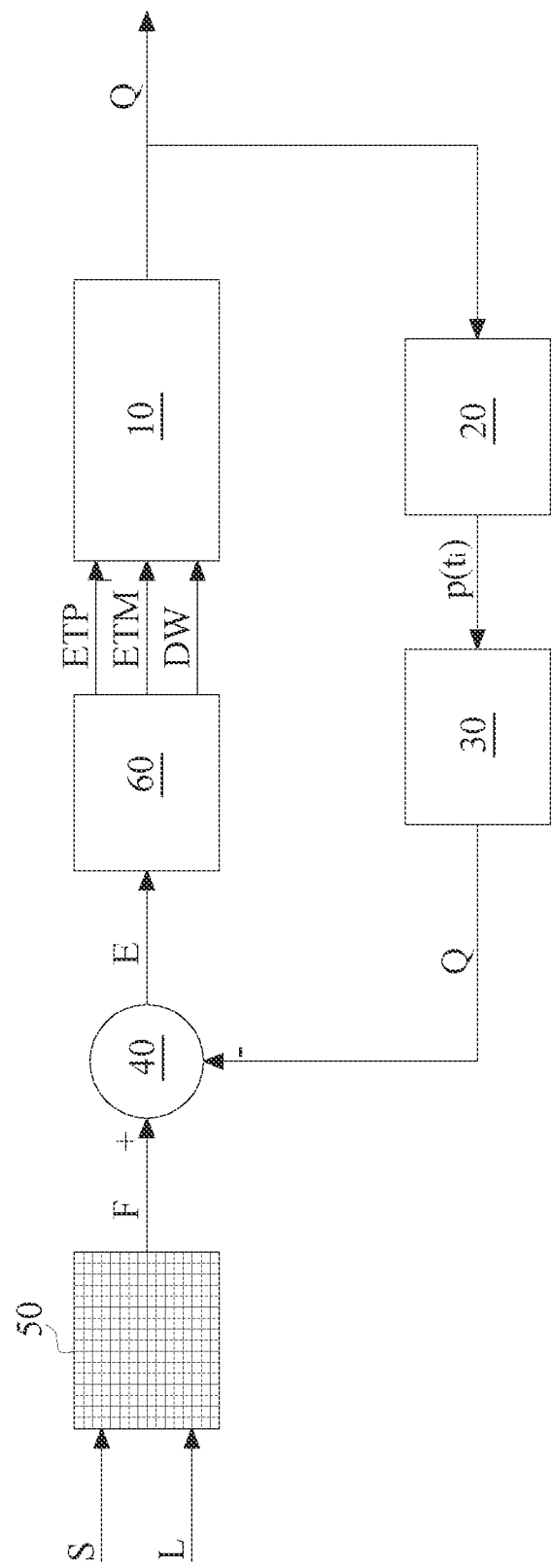
FIG. 5 is a flowchart representing an injection system operating method according to an embodiment.

The following detailed description is merely exemplary in nature and is not intended to limit application and uses. Furthermore, there is no intention to be bound by any theory presented in the preceding background or summary or the following detailed description.

An embodiment provides a method for operating a direct injection system of a Diesel engine of a motor vehicle. The direct injection system comprises one electrically commanded solenoid injector per engine cylinder. The present embodiment is hereinafter explained referring to a single engine cylinder, since the operating method is performed equally for each engine cylinder.

During the operation of the engine, a plurality of engine cycles occur in sequence inside the cylinder, each of which comprises a fuel injection phase located across the compression stroke and the expansion stroke. The fuel injection phase is carried out by the solenoid injector according to a multi-injection pattern, which generally provides for executing a plurality of different injection events during the same injection phase.

In the present example, See FIG. 1 and FIG. 3, the injection pattern comprises only two consecutive injection events, including a pilot injection P followed by a main injection M. As a consequence, the most important fuel injection parameters governing the fuel injection phase are: the energizing time ETP of the pilot injection, the energizing time of the main injection ETM, and the dwell time DW between the pilot and the main injection.

The energizing time is defined as the duration of the electric signal that commands the injector to open and generally corresponds to the duration of a single injection event. Since, after a transitory state, the solenoid injector provides a substantially constant fuel injection rate dQ/dt, it follows that the energizing time ETP of the pilot injection P, and the energizing time ETM of the main injection M, strongly influence the fuel quantity that is actually injected into the cylinder.

The dwell time DW is defined as the time period between the beginning of the electric signal responsible of the pilot injection P and the beginning of the electric signal responsible of the main injection, and generally corresponds to the time period between the start of the pilot injection P and the start of the main injection M.

When the pilot P and the main injection M are sufficiently close, they hydraulically fuse together, forming a single aggregated injection event A (See FIG. 4). The fusion generally occurs when the difference TD (timing distance) between the dwell time DW and the energizing time ETP of the pilot injection P is less than approximately 100 µs. In this condition, it has been found that any variation of the dwell time DW can strongly influence the global quantity of fuel that is injected during the aggregated injection event A, even if the energizing time ETP and ETM are kept constant. Therefore, the dwell time DW between the pilot P and the main injection M is another important parameter that strongly influences the quantity of fuel actually injected into the cylinder.

Referring to a single engine cylinder, the fuel injection system can therefore be modeled as a black box 10 (See FIG. 5), whose inputs are the energizing time ETP of the pilot injection P, the energizing time ETM of the main injection M and the dwell time DT between them, while the output is the injected fuel quantity Q. According to the present embodiment, the operating method of the injection system generally provides for closed loop controlling the injected fuel quantity Q during each engine cycle, and for adjusting the fuel injection parameters ETP, ETM and DW to be applied to the injection system in the next engine cycle, in order to minimize the difference E between the actual injected fuel quantity Q and a predetermined target value F.

In greater detail, the method provides for sampling the pressure within the cylinder, also referred as in-cylinder pressure, at least during the fuel injection phase, and for estimating the actual injected fuel quantity Q as a function of the sampled in-cylinder pressure measures p(ti). The in-cylinder pressure can be measured by means of a conventional in-cylinder pressure sensor, indicated with the reference 20 in FIG. 5, which is usually integrated in a glow plug associated to the cylinder.

The in-cylinder pressure measures p(ti) are then sent to a computational module 30 that estimates the injected fuel quantity Q, by means of suitable mathematical equations. By way of example, this estimation can be achieved with the aid of the equations provided in "A Simple Approach to Study the Relation Between Fuel Rate, Heat Release Rate and NOx-Formation in Diesel Engines", author: Rolf Egnell, SAE Technical Paper 1999-01-3548, published on October 1999, pages 1-3. As a matter of fact, the Egnell's equations correlate the in-cylinder pressure to the fuel injection rate dQ/d, which can be time integrated for calculating the injected fuel quantity Q. The Egnell's equations are available in literature and are well known by the skilled in the art. Nevertheless, many other mathematical equations can be studied and/or used for correlating the in-cylinder pressure with the fuel injection rate and the injected fuel quantity.

The estimated injected fuel quantity Q is then sent to an adder 40 that calculates the difference E, also referred as error, between the estimated injected fuel quantity Q and the above mentioned predetermined target value F. The target value F is determined from a data set or map 50 correlating the target value F to a plurality of engine operating parameters, including engine speed S and engine load L. The target values F stored in the data set or map 50 are empirically determined with a calibration activity. The difference E is then supplied to a governor module 60 that is globally configured for adjusting the injection fuel parameters ETP, ETM and DW to be used for commanding the injection phase of the next engine cycle, in order to minimize the difference E.

Figure 6:
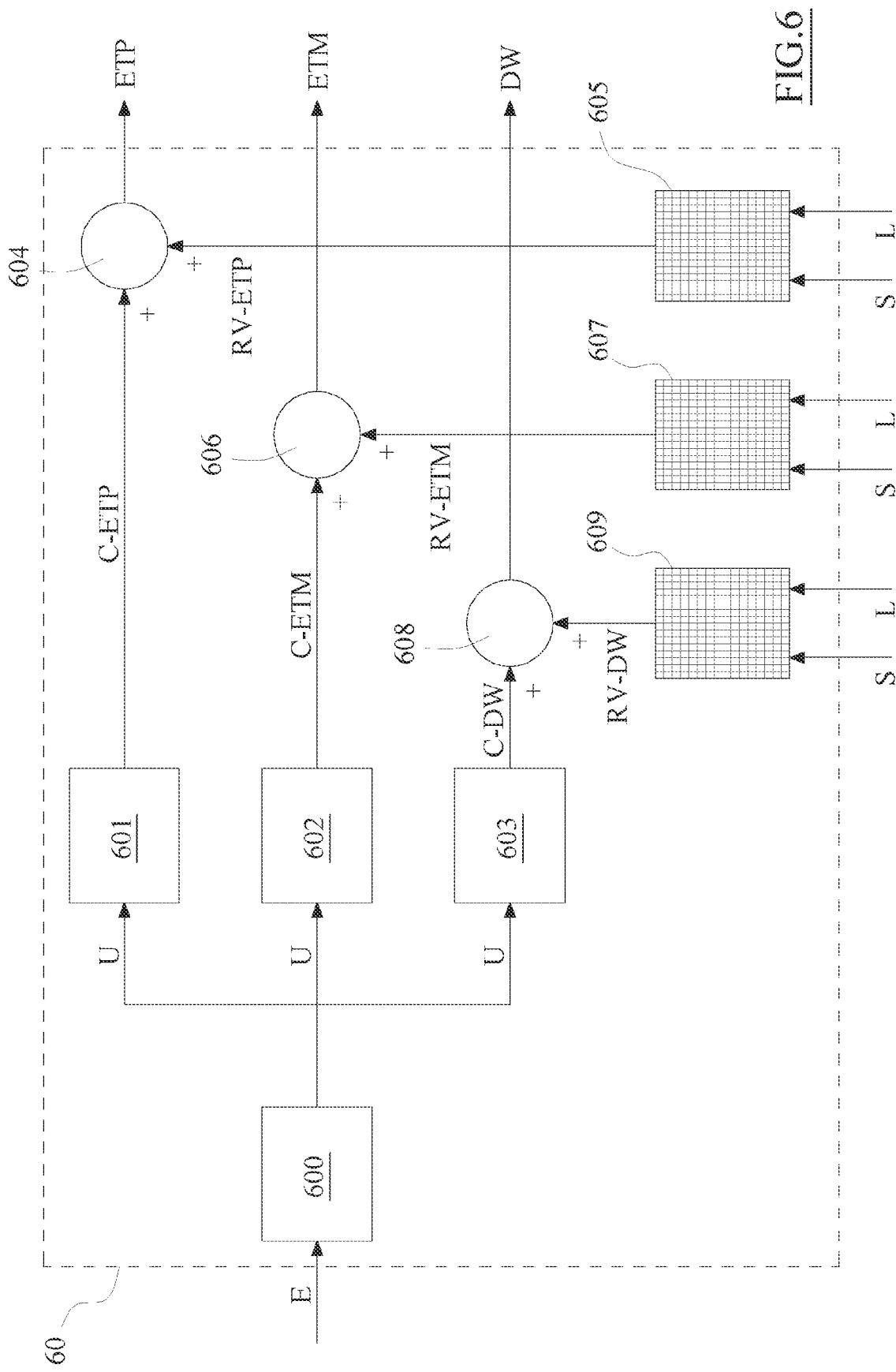
FIG. 6 is a flowchart representing the subroutine of the governor module 60 of FIG. 5.

As shown in FIG. 6, the governor module 60 comprises a PI controller 600 that receives the difference E as input signal, in order to calculate a proportional-integrative output signal U on the base of the difference E itself. The output signal U is contemporaneously sent to three different empirically determined data sets, respectively indicated with the references 601, 602 and 603.

The first data set 601 correlates the output signal U to a correction C-ETP to be applied to an energizing time reference value RV-ETP, in order to calculate the new energizing time ETP of the pilot injection P. In the present embodiment, the new energizing time ETP is calculated by means of an adder 604 that sums the reference value RV-ETP and the correction C-ETP. The reference value RV-ETP is determined from a data set or map 605 correlating the reference value RV-ETP to a plurality of engine operating parameters, including engine speed S and engine load L.

The second data set 602 correlates the output signal U to a correction C-ETM to be applied to an energizing time reference value RV-ETM, in order to calculate the new energizing time ETM of the main injection M. In the present embodiment, the new energizing time ETM is calculated by means of an adder 606 that sums the reference value RV-ETM and the correction C-ETM. The reference value RV-ETM is determined from a data set or map 607 correlating the reference value RV-ETM to a plurality of engine operating parameters, including engine speed S and engine load L.

The third data set 603 correlates the output signal U to a correction C-DW to be applied to a dwell time reference value RV-DW, in order to calculate the new dwell time DW between the pilot P and the main injection M. In the present embodiment, the new dwell time DW is calculated by means of an adder 608 that sums the reference value RV-DW and the correction C-DW. The reference value RV-DW is determined from a data set or map 609 correlating the reference value RV-DW to a plurality of engine operating parameters, including engine speed A and engine load B.

The operating method described herein above is repeated engine cycle by engine cycle. While the injection parameter ETP, ETC and DW has been expressed in time-domain, they can be alternatively expressed in term of angular position of the engine crankshaft. While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for operating a direct injection system of an internal combustion engine of a motor vehicle, comprising:
   receiving a difference between an estimated injected fuel quantity and a target fuel quantity;
   determining a proportional-integrative (PI) output based on the difference;
   determining a first correction value of a pilot injection parameter based on the PI output;
   determining a second correction value of a main injection parameter based on the PI output;
   determining a third correction value of a dwell time between a pilot injection and a main injection based on the PI output;
   adjusting the pilot injection parameter based on the first correction value;
   adjusting the main injection parameter based on the second correction value;
   adjusting the dwell time based on the third correction value; and
   controlling fuel injection of a solenoid injector based on the adjusted pilot injection parameter, the adjusted main injection parameter, and the adjusted dwell time.

2. The method according to claim 1, wherein the controlling the fuel injection is based on a multi-injection pattern having at least two consecutive injection events separated by a time distance shorter than approximately 100 μs.

3. The method according to claim 1, further comprising estimating the injected fuel quantity as a function of an in-cylinder pressure.

4. The method according to claim 3, further comprising measuring the in-cylinder pressure with an in-cylinder pressure sensor.

5. The method according to claim 1, wherein the target fuel quantity is determined based on an engine operating parameter.

6. The method according to claim 1, wherein the target fuel quantity is determined from an empirical data set, which correlates the target fuel quantity to an engine operating parameter.

7. A computer readable medium embodying a computer program product, said computer program product comprising:
   a program for operating a direct injection system of an internal combustion engine of a motor vehicle, the program configured to:
      receive a difference between an estimated injected fuel quantity and a target fuel quantity;
      determine a proportional-integrative (PI) output based on the difference;
      determine a first correction value of a pilot injection parameter based on the PI output;
      determine a second correction value of a main injection parameter based on the PI output;
      determine a third correction value of a dwell time between a pilot injection and a main injection based on the PI output;
      adjust the pilot injection parameter based on the first correction value;
      adjust the main injection parameter based on the second correction value;
      adjust the dwell time based on the third correction value; and
      control fuel injection of a solenoid injector based on the adjusted pilot injection parameter, the adjusted main injection parameter, and the adjusted dwell time.

8. The computer readable medium according to claim 7, said program further configured to control the fuel injection based on a multi-injection pattern having at least two consecutive injection events separated by a time distance shorter than approximately 100 μs.

9. The computer readable medium according to claim 7, said program further configured to estimate the injected fuel quantity as a function of an in-cylinder pressure.

10. The computer readable medium according to claim 9, said program further configured to receive the in-cylinder pressure measured by an in-cylinder pressure sensor.

11. The computer readable medium according to claim 7, wherein the target fuel quantity is determined based on an engine operating parameter.

12. The computer readable medium according to claim 7, wherein the target fuel quantity is determined from an empirical data set, which correlates the target fuel quantity to an engine operating parameter.

13. The method of claim 1, further comprising:
   determining the main injection parameter based on a first data set or first map that correlates the main injection parameter with engine operating parameters;
   determining the pilot injection parameter based on a second data set or second map that correlates the main injection parameter with engine operating parameters; and
   determining the dwell time based on a third data set or third map that correlates the main injection parameter with engine operating parameters.

14. The method of claim 1, wherein the adjusting the pilot injection parameter comprises adjusting the pilot injection parameter by adding the first correction value to the pilot injection parameter, wherein the adjusting main injection parameter comprises adjusting the main injection parameter by adding the second correction value to the main injection parameter, and wherein the adjusting the dwell time comprises adjusting the dwell time by adding the third correction value to the dwell time.

* * * * *